United States Patent

[11] 3,580,373

| [72] | Inventor | Stanley A. Stickle<br>Anaheim, Calif. |
|---|---|---|
| [21] | Appl. No. | 777,564 |
| [22] | Filed | Nov. 21, 1968 |
| [45] | Patented | May 25, 1971 |
| [73] | Assignee | Clark Equipment Company |

[54] PORTABLE RAMP
2 Claims, 10 Drawing Figs.

[52] U.S. Cl. ................................................ 193/5,
193/38, 193/41
[51] Int. Cl. ........................................... B65g 11/00
[50] Field of Search ............................. 193/5, 38, 41

[56] References Cited
UNITED STATES PATENTS

| 931,544 | 8/1909 | Worth | 193/38 |
| 963,918 | 7/1910 | Miller | 193/38 |
| 1,626,597 | 5/1927 | Cantor | 193/38 |
| 2,803,328 | 8/1957 | Hinchman | 193/41 |
| 3,064,783 | 11/1962 | McClelland | 193/38 |

*Primary Examiner*—Andres H. Nielsen
*Attorneys*—Kenneth C. Witt, John C. Wiessler, Robert H. Johnson and Reginald J. Falkowski ABSTRACT: A portable ramp having a plurality of elongated floor members with devices for detachably securing the floor members together in side-by-side relation to form a complete floor portion. A transverse member is detachably secured to the floor member at one end thereof and to a vehicle and another detachable transverse member is detachably secured to the floor portion at the other end thereof.

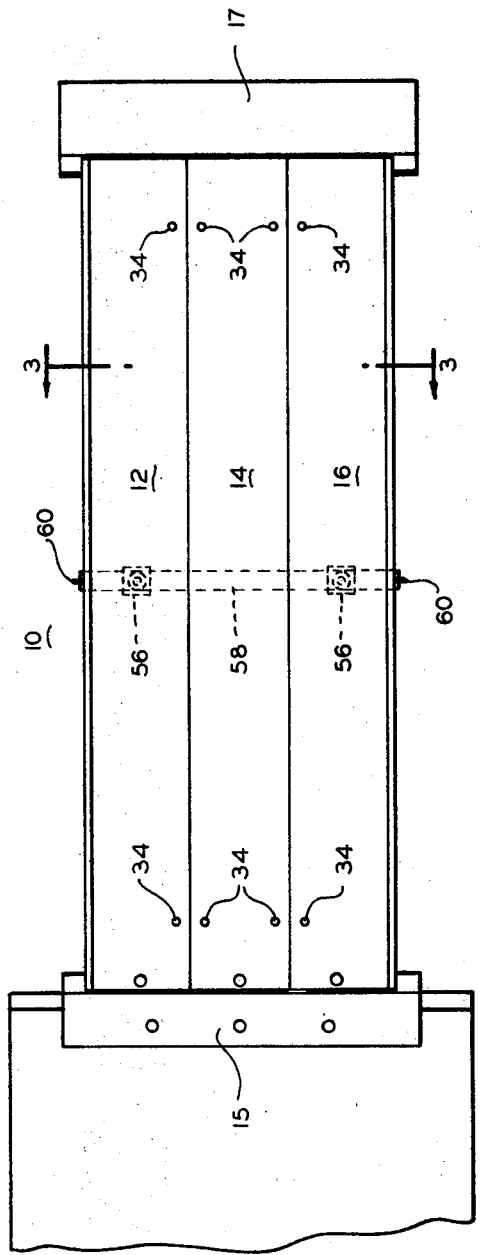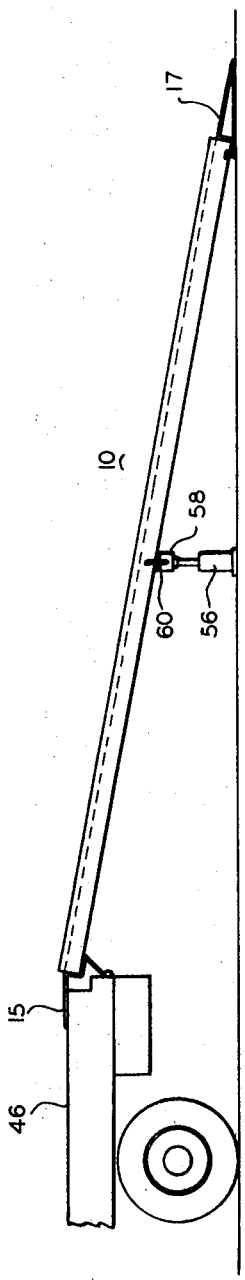

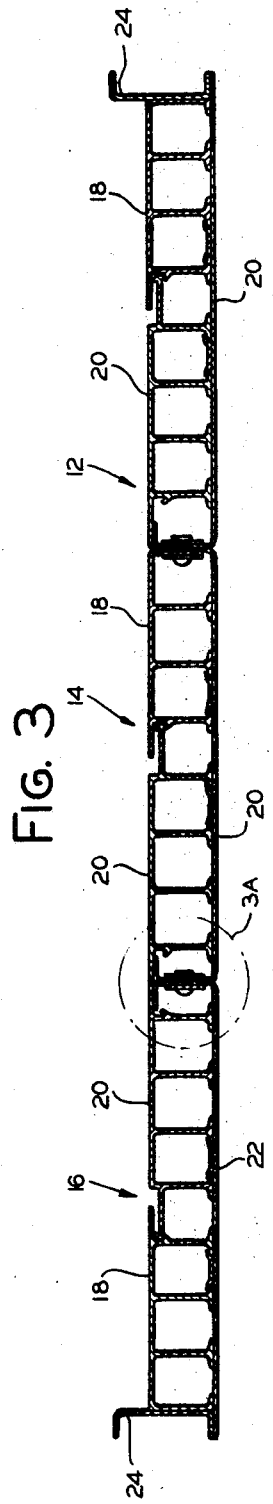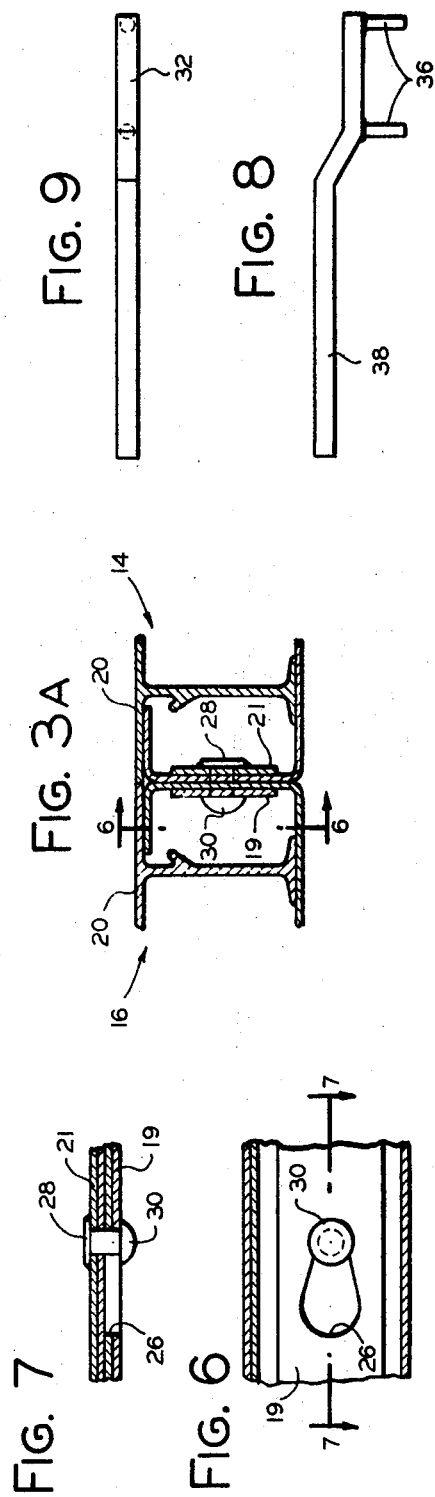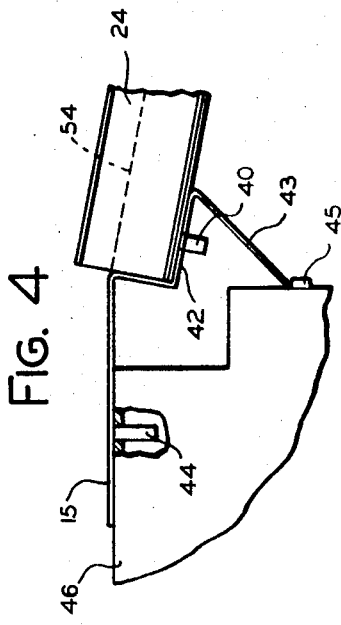

PORTABLE RAMP

BACKGROUND OF THE INVENTION

It is customary to employ a ramp or dock board in the loading and unloading of trucks, trailers and railroad cars, particularly if the floor of the vehicle is at a different elevation than the dock or ground to or from which the freight is to be transferred. Such a ramp provides the surface over which freight is transferred, by a hand truck, power-operated fork truck, a person carrying the freight, or otherwise, between the level of the vehicle floor and the level of the dock or ground.

Various ramps or dock boards have been used heretofore. Some are built into the dock and are arranged to be raised or lowered to match the height of the floor of the vehicle. Others are built into the vehicle and are arranged to be moved from a stowed position to an operative position after the vehicle has been located in the position in which it is to be loaded or unloaded. Others are of the portable type and are arranged to be put in place manually or by means of suitable machinery to provide the necessary bridge or ramp between the floor of the vehicle and the surface to or from which the load is to be taken.

The present invention provides a portable ramp which may be readily disassembled into parts sufficiently small that they may be handled manually. Moreover, after the ramp has been disassembled the parts thereof are sufficiently small that it is convenient if desired to carry such parts on the vehicle so that it is possible readily to assemble them again at the destination of the vehicle for use as a ramp in loading or unloading the vehicle.

SUMMARY OF THE INVENTION

In carrying out my invention in one preferred mode or embodiment thereof, I provide a portable ramp which includes a plurality of elongated floor members and means for detachably securing the floor members together in side-by-side relation to form a complete floor portion. A transverse member is provided for one end of the floor portion which includes means for detachably securing such transverse member to the floor portion. A second transverse member is provided for the other end of the floor portion along with means for detachably securing such second transverse member to the other end of the floor portion.

BRIEF DESCRIPTION OF THE DRAWING

In the drawing:

FIG. 1 is a schematic top plan view of the ramp of this invention completely assembled in operative position, FIG. 2 is a side elevational view of the ramp of FIG. 1, FIG. 3 is a sectional view along line 3–3 of FIG. 1, FIG. 3A is an enlarged view of a portion of FIG. 3, FIG. 4 is an enlarged view of one end of the assembled ramp, FIG. 5 is an enlarged view of the other end of the assembled ramp, FIG. 6 is a fragmentary view along the line 6–6 of FIG. 3 illustrating in greater detail the fastening arrangement utilized in this embodiment of the invention, FIG. 7 is a fragmentary sectional view looking down on a portion of the structure shown in FIG. 6, FIG. 8 is a side elevational view of a tool which may be used in securing two floor members of the ramp together in this preferred embodiment, and FIG. 9 is a top view of the tool of FIG. 8.

DESCRIPTION OF THE PREFERRED EMBODIMENT

In the drawing the numeral 10 indicates generally a portable ramp in accordance with the present invention. The ramp 10 is comprised of three elongated floor members or sections indicated respectively by the numerals 12, 14 and 16, and two transverse members 15 and 17, one at each end of the ramp.

As shown in FIG. 3, each of the three floor members or sections is comprised of aluminum extrusions 18 and 20 such as are used for the floor structure of some semitrailers, particularly refrigerated semitrailers, with a metal plate 22 across the bottom securing the two extrusions together in each case to form a single unitary floor member. Such structure was chosen because it is light but strong, but it will be appreciated that the invention is not limited to this particular structure. It will be observed that floor member 12 on the right (as seen in FIG. 3) and floor member 16 on the left have upwardly extending side members 24 secured thereto for safety purposes, that is, to assist in preventing a person or vehicle from going off the side of the ramp.

The three floor members are firmly secured together, and in the preferred embodiment described and illustrated herein this is accomplished by means of key-slot connections, one of which is illustrated in FIGS. 6 and 7. As shown, the right side wall 19 of floor member 16 is provided with an elongated slot indicated by the numeral 26 which is sufficiently enlarged at the left end (as shown in FIG. 6) to admit the head 28 of a retainer member which is secured to the left sidewall 21 of floor member 14. It will be appreciated that if the head 28 is inserted through the large portion of slot 26 and then moved to the right to the position illustrated in FIG. 6 that the two floor members 14 and 16 then will be held firmly in engagement. In a typical ramp embodying the present invention there are two key-slot connections, as described and illustrated herein, between each abutting pair of floor members, that is, between 12 and 14 and between 14 and 16.

To facilitate the longitudinal movement of one floor member with respect to the other as previously described, after the head portion 28 has been inserted through the opening in the side wall of the adjacent floor member, a tool 32 as illustrated in FIG. 8 and 9 may be utilized in conjunction with openings 34 in the floor members. It will be appreciated that FIGS. 8 and 9 are on a considerably larger scale than FIG. 1. The openings 34 in the floor members are sufficiently large that the projections 36 on a tool 32 may be inserted in two of the adjacent openings 34, one in each of two abutting floor members, and the handle 38 of tool 32 then pulled longitudinally so as to slide one floor member with respect to the other until they reach the position illustrated in FIGS. 6 and 7 of the drawing.

As illustrated in FIG. 4, each of the floor members 12, 14 and 16 has a downwardly projecting portion or detent 40 which projects through a mating opening in a shoulder portion 42 of transverse member 15. In the form of the invention illustrated, the ramp is intended for bridging between a vehicle at the left which is higher than the ground or dock at the right and accordingly the shoulder portion 42 is slanted to accommodate the floor portion 12, 14, 16.

The upper part of transverse member 15 has downwardly projecting portions or detents 44 which project through suitable mating openings in the threshold of the vehicle 46 on which the member 15 is mounted. As illustrated there are three of these detents 44 but it will be appreciated that any desired number may be utilized. The shoulder portion 42 of transverse member 15 may be supported by a brace portion 43 which has its bottom edge resting on a projection 45 on the vehicle.

At the other end of the floor portion 12, 14, 16 the transverse member 17 as seen best in FIG. 5 is provided with forwardly projecting, upwardly turned portion 48 which engages in a suitable groove 50 which is cut entirely across the floor portion. The weight of the floor portion and any vehicles or persons who may be thereon, of course, hold transverse member 17 firmly in position. It will be observed that the upper surface 52 of transverse member 17 is in alignment with the upper surface 54 of the floor portion so that when the ramp is assembled as illustrated herein it serves to provide a smooth bridging surface between the ground or dock and the threshold of the vehicle.

If desired, it is possible to increase the capacity of this ramp by utilizing supplementary jacks 56 or other supports between the two ends of the ramp. As shown in FIGS. 1 and 2, there are two jacks 56 which engage the underside of a transverse brace member 58. Member 58 in turn is held in position by means of a U-shaped keeper member 60 on each side of the ramp. Each of these keepers projects into an opening in the end of brace 58 and into an opening in the side of the floor portion of the ramp; however, the keeper 60, the cross brace 58 and the jacks 56 may be readily removed manually when there is no load on the ramp.

It will be appreciated also that the remainder of the ramp also may be readily disassembled by first removing the floor portion from the transverse members 15 and 17, by lifting it, and then separating the floor members from each other, using the tool 32 if necessary. The transverse members 15 and 17 of course are removed for use with the remainder of the parts of the ramp for another loading or unloading operation. All parts of the ramp, that is, floor members 12, 14 and 16, and transverse members 15 and 17, are held in position by gravity.

In a typical portable ramp constructed in accordance with this invention, the floor members are 12 feet long and a little more than 15 inches wide each, and each such floor member weighs approximately 75 pounds. Thus it will be appreciated that it is possible readily to move the parts of this ramp manually from place to place and assemble it where needed. With the typical ramp mentioned, utilizing the auxiliary jacks, it has been found possible to move over the ramp loads which weigh as much as 10,000 pounds.

While I have described and illustrated herein a preferred mode of carrying out my invention in accordance with the statute, it will be understood by those skilled in the art that modifications may be made. It should be understood therefore that I intend to cover by the following claims all such modifications which fall within the true spirit and scope of my invention.

I claim:

1. A portable ramp comprising:

a plurality of elongated floor members having sidewalls, said sidewalls having key-slot means for detachably securing the said floor members together in side-by-side relation to form a complete floor portion, a first transverse member having gravity means for detachably securing the said floor portion at one end thereof to the said first transverse member and for detachably connecting said transverse member to a vehicle, said first transverse member maintaining said key-slot means in a position to secure said floor members together when said floor portion is secured to said first transverse member, and a second transverse member having gravity means for detachably securing the said floor portion at the other end thereof to be said second transverse member.

2. A portable ramp as specified in claim 1 in which a cross brace is provided intermediate the ends of the said floor portion, said cross brace having means at each end thereof for securing it to the sides of the said floor portion, and at least one jack supporting the said cross brace.